(No Model.) 4 Sheets—Sheet 1.
T. A. B. PUTNAM.
SIGNALING TELEGRAPH FOR CABLE RAILWAYS.

No. 457,565. Patented Aug. 11, 1891.

WITNESSES:
J. A. E. Criswell
C. K. Fraser.

INVENTOR:
Theodore A. B. Putnam.
By his Attorneys,
Arthur C. Fraser (No Model.) 4 Sheets—Sheet 2.

T. A. B. PUTNAM.
SIGNALING TELEGRAPH FOR CABLE RAILWAYS.

No. 457,565. Patented Aug. 11, 1891.

WITNESSES:

INVENTOR:
Theodore A. B. Putnam,
By his Attorneys, (No Model.) 4 Sheets—Sheet 3.
T. A. B. PUTNAM.
SIGNALING TELEGRAPH FOR CABLE RAILWAYS.

No. 457,565. Patented Aug. 11, 1891.

WITNESSES:

INVENTOR:
Theodore A. B. Putnam,
By his Attorneys, (No Model.)
4 Sheets—Sheet 4.

T. A. B. PUTNAM.
SIGNALING TELEGRAPH FOR CABLE RAILWAYS.

No. 457,565.
Patented Aug. 11, 1891.

FIG. 10.

WITNESSES:
John Becker
C. K. Fraser.

INVENTOR:
Theodore A. B. Putnam
By his Attorneys,
Arthur C. Fraser & Co.

UNITED STATES PATENT OFFICE.

THEODORE A. B. PUTNAM, OF NEW YORK, N. Y., ASSIGNOR, BY DIRECT AND MESNE ASSIGNMENTS, OF SEVEN-EIGHTHS TO ELLA S. WEBSTER AND ALBERT COMSTOCK, OF SAME PLACE, AND JOSHUA W. POWELL, OF BROOKLYN, NEW YORK.

SIGNALING-TELEGRAPH FOR CABLE RAILWAYS.

SPECIFICATION forming part of Letters Patent No. 457,565, dated August 11, 1891.

Application filed March 13, 1889. Serial No. 303,133. (No model.)

*To all whom it may concern:*

Be it known that I, THEODORE A. B. PUTNAM, a citizen of the United States, residing in New York city, in the county and State of New York, have invented certain new and useful Improvements in Signaling-Telegraphs for Cable Railways, of which the following is a specification.

It sometimes occurs in the running of a cable railway that a grip-car cannot be disconnected from the cable, owing to some imperfection either of the grip or cable, and when such difficulty occurs considerable damage is apt to be done by reason of the inability to stop the car. Serious accidents have resulted from this cause. In such an event it is necessary to stop the cable, which necessitates sending word to the power-house, in order that the engines may be stopped or disconnected from the cable-drums. The signaling of the power-house has been attempted by means of telegraph-wires either overhead or laid in the usual cable-conduit, transmitting-instruments being provided at intervals, which may be operated by the nearest inspector or track-walker; but such systems have been found so wanting in promptness as to be practically almost useless.

The object of my invention is to provide a signaling-telegraph by means of which an alarm may be instantly given in the power-house by the driver of any one of the grip-cars whenever he finds that his grip has got caught to the cable so that he cannot release it. By my invention the signal can be given by the gripman without leaving his post and without a moment's delay, thereby saving every available second of time at an instant when even a slight delay may result in a serious accident.

According to my invention I provide the cable railway with an electric circuit including as one portion thereof a conductor extended along the track in any convenient position and partially bared, so that contact may be made with it from the moving car, this conductor being connected with one of the terminals of a battery, dynamo, or other current-generator—say, for example, the positive terminal—while the opposite or negative terminal thereof is connected with the track or other portion of the structure, and hence ultimately with the several moving cars, and I provide on each car a contact-bridge or contact-maker so arranged relatively to the extended contact-conductor that the gripman may be able at will to bring it into contact with said conductor, and thereby close the circuit through a receiving electro-magnet placed in said circuit at the power-house. An annunciator or other alarm or signal device is provided at the power-house to be operated or controlled by said receiving-magnet. Thus whenever any gripman touches his contact-bridge to the conductor the said magnet is excited and a signal is caused to be given to the engine-driver or attendant in the power-house. This signal may be a visual or an oral signal, and may be given from the receiving-magnet in any of the many ways known in the art of electric signaling. For further security and to provide against any accidental derangement of the circuits I connect both ends of said contact-conductor with the current-generator, the opposite ends of the conductor being joined to opposite poles of the generator, so that the conductor forms a closed defect-alarm circuit through which a current is continually flowing, and in this circuit I introduce another electro-magnet, which is also effective to give an alarm, the alarm, however, in this case being given by the demagnetization of the magnet, so that an alarm from this source will indicate that the circuit has become broken or imperfect and is no longer to be relied upon. The two alarms may be distinct, so as to indicate the source of danger, or one alarm may serve both purposes. In case of the latter arrangement, which I ordinarily prefer, I construct the first-named or receiving magnet as a relay the attraction of which serves to break the circuit through the second magnet, so that the latter is demagnetized whenever any signal is to be given.

By a further development of my invention

I provide means for utilizing the electric circuit as a circuit for signaling or telegraphing from any part of the line to the power-house after the cable has been stopped and in order to indicate to the engineer when it is to be started again or to transmit any other desired information according to any code of signals which may be adopted.

My invention also pertains to the means for applying my contact-conductor within the conduit of cable street-railways and to provisions on the grip-car for operating the contact-bridge to bring it against said contact-conductor.

Referring to the accompanying drawings.

Figures 1, 7:
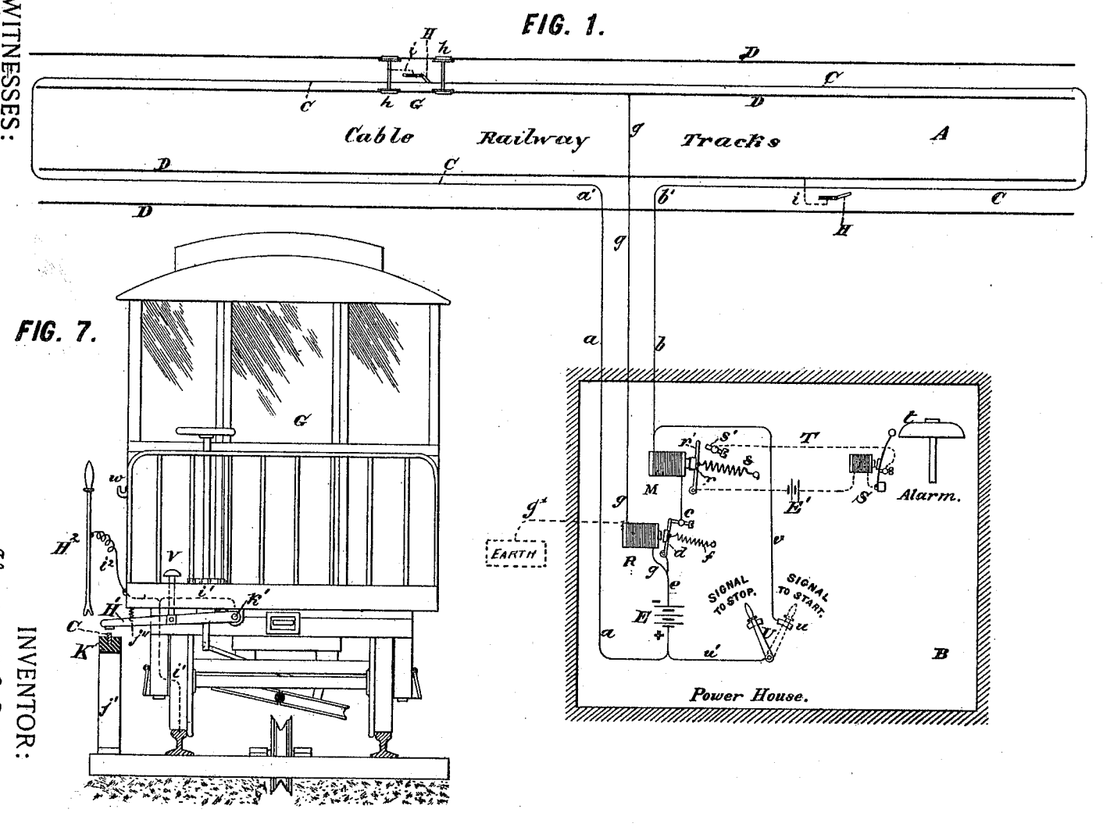
Figure 1 is a diagrammatic view indicating the railway-track in plan and showing the electrical connections with the power-house and the instruments at the power-house for giving the alarm.
Fig. 7 is a transverse section of a cable-railway track and end elevation of a car, showing a construction of my invention applicable to elevated railways and railways of the character employed on the East River bridge.

Referring to Fig. 1, let A designate as a whole the cable-railway structure of any known kind, and B the power-house. The cable and means for propelling it are not shown in this figure, since they are not necessary to an understanding of my invention.

C is the contact-conductor, and D D are the rails. The opposite ends $a'$ and $b'$ of the contact-conductor C are connected by wires or conductors $a$ and $b$, respectively, to the opposite terminals $+$ and $-$ of an electric battery E, or a dynamo-electric machine, or other source of electric current, the current thus formed being a normally-closed defect-alarm circuit. The wire $a$ makes direct connection with the positive pole, while the conductor $b$ makes indirect connection with the negative pole, through the coils of the magnet M and through a contact-screw $c$ and contact-lever $d$ and thence through a wire $e$. A receiving or relay magnet R, arranged to attract the armature carried by lever $d$ against the tension of its retracting-spring $f$, is joined in a branch circuit $g\,g$, connecting with the structure A, or more exactly with the rails D D thereof, whereby is formed what constitutes substantially an earth connection, since, as usual, the rails are uninsulated. Hence the wire $g$ may lead to earth instead, as indicated in dotted lines at $g'$ in Fig. 1.

G designates a grip-car, the wheels $h\,h$ of which by rolling along the rails D D make electric contact therewith, thereby putting the car and in like manner all the other grip-cars on the road into electrical connection with the receiving-relay R and the negative pole of the battery E by a ground or partial ground return-circuit comprising the rails, earth, and the wire $g$ or $g'$. Each grip-car carries a contact-bridge or circuit-closing piece H, which is in electrical connection with the wheels $h$, preferably through the iron frame-work of the grip-car and the axle-bearings, this connection being indicated by the dotted line $i$. There is thus constituted a normally-open signaling-circuit consisting of the contact-conductor C, wire $a$, generator E, magnet R, wire $g$, earth, and the rails.

Figure 2:
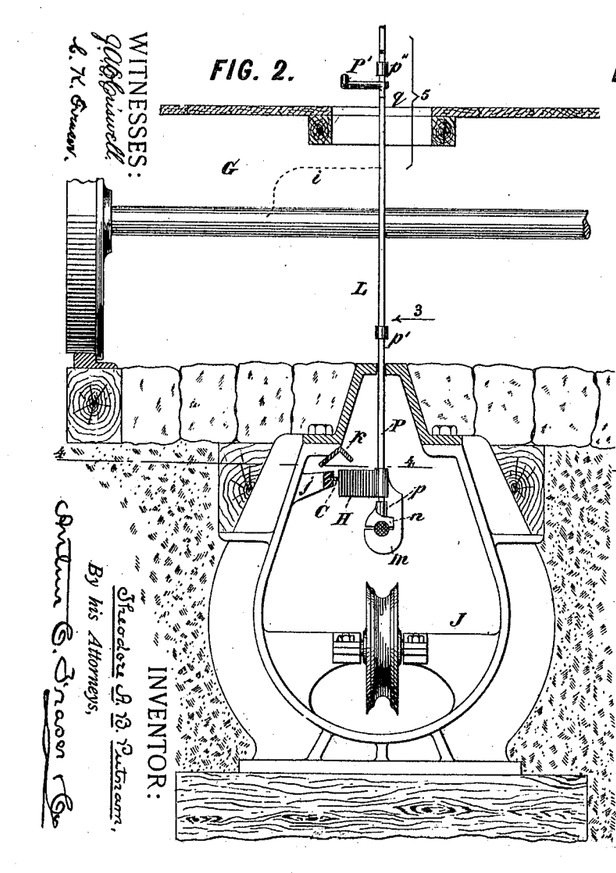
Fig. 2 is a vertical transverse section through a cable-conduit and showing as much of the grip-car as is necessary to illustrate the application of my invention.
Figure 3:
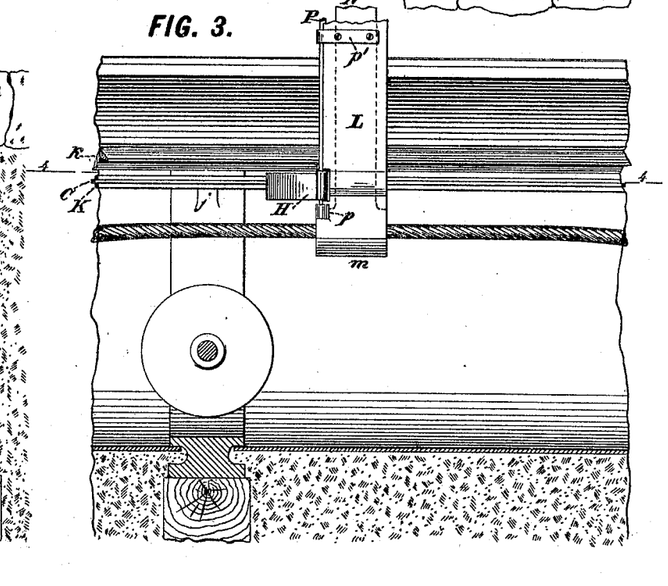
Fig. 3 is a vertical longitudinal section through the cable-conduit in a plane intersecting the slot.
Figure 4:
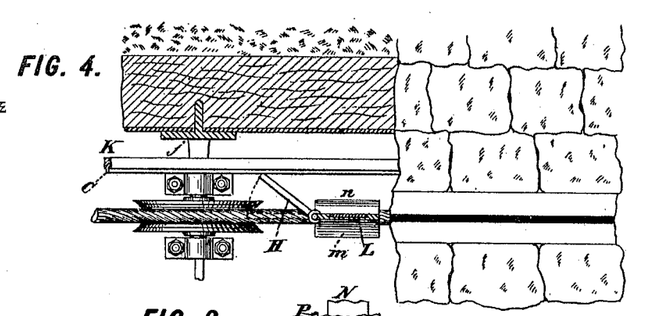
Fig. 4 is a plan view, partly in horizontal section, cut in the plane of the line 4 4 in Figs. 2 and 3.
Figures 5, 6, 8, 9:
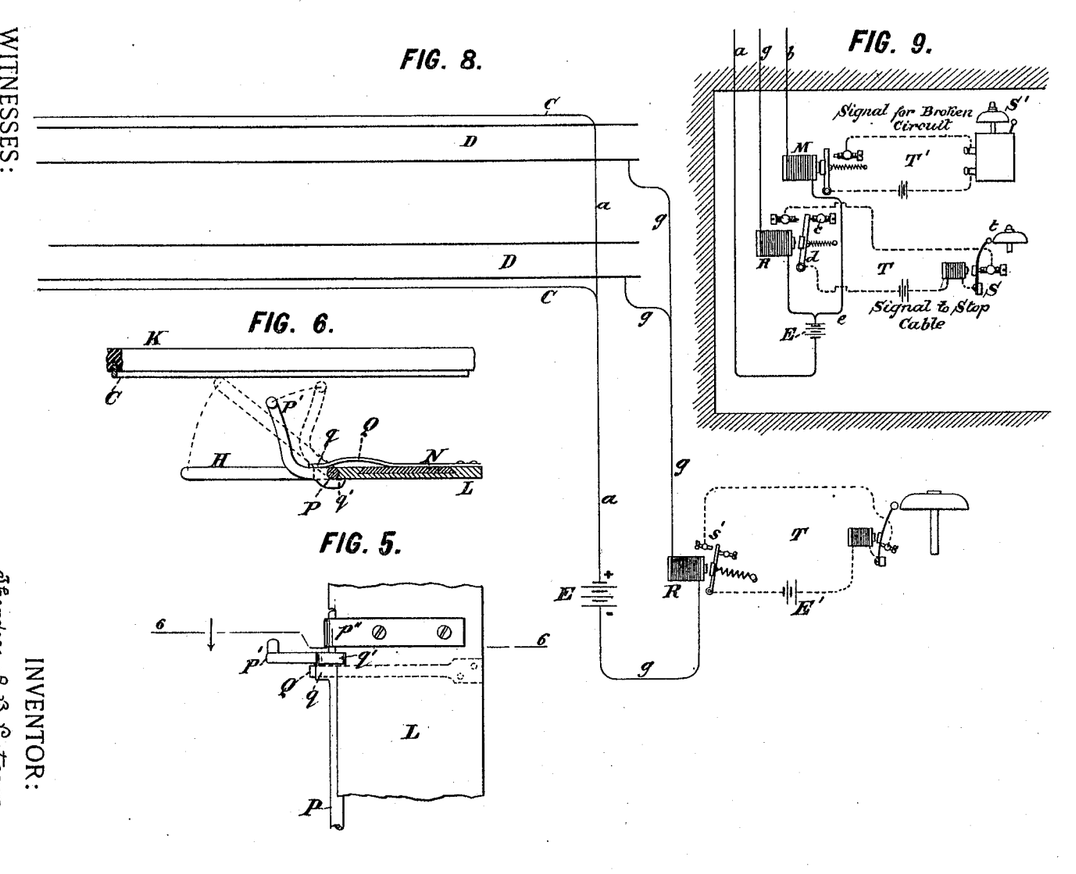
Fig. 5 is a fragmentary side elevation of the grip mechanism looking in the same direction as Fig. 3, but on a larger scale, and showing the portion of the grip mechanism indicated by the bracket 5 in Fig. 2.
Fig. 6 is a fragmentary plan of the grip mechanism and the contact-bridge and conductor partly in section on the line 6 6 in Fig. 5.
Fig. 8 is a diagrammatic view answering to Fig. 1, and showing a modified construction.
Fig. 9 is a diagrammatic view of another circuit arrangement

The preferred construction of the contact-conductors C and bridge H will be best understood from Figs. 2 to 6, inclusive. The conductor C is here shown as extended through the conduit J, which is of the usual or may be of any ordinary construction. It is necessary that one edge or portion of this conductor C shall be exposed or bared, and it is essential that this bared edge shall be practically continuous, although it might be intermittent if the conducting portions were so closely joined as to give an instantaneous signal when the conducting-bridge is depressed. To provide for such a continuous bared edge and to properly support the conductor and to otherwise insulate it, it is preferably partly embedded in a bar K of insulating material, as best shown in Fig. 6. This bar is suitably supported at intervals within the conduit—for example, by means of brackets $j$, one of which is shown in Figs. 2, 3, and 4, and which may project from the stiffening-frames of the conduit. It is preferable to shield the conductor from water or mud by arranging a continuous roof-plate $k$ over it, as shown in Figs. 2 and 3. Preferably, also, the conductor C is arranged at one side of the conduit, in order to be out of the way of the usual grip mechanism which slides in the slot.

In the drawings the grip mechanism is shown as consisting of a plate L, carrying the grip jaw or block $m$ and having a plate or bar N dovetailed into it and carrying the grip jaw or fork $n$, this being one of the numerous known constructions of grip mechanisms, any one of which may be substituted for it in applying my invention. I have not shown the mounting for the plates L N, by which they are connected to the car-body, nor the means for sliding these plates to open or close the grip, as these parts are well known and have no relation to my invention.

The contact-bridge or circuit-closer H is preferably constructed of a metal plate pivoted to the grip mechanism, so that it may swing to one side, after the manner of a rudder. It is shown in its normal position in full lines in Fig. 6, while in Figs. 2, 3, and 4 it is shown as swung over, in order to make contact with the conductor C. In order to operate this rudder-like plate, it is mounted on a rod or shaft P, having bearings at $p$, $p'$, and $p''$. The bearings $p'$ and $p''$ consist of straps passed around the plate L, as shown in Figs 3 and 5. For better supporting the rod P it is seated against or partly within a half-round groove formed in the rear edge of the plate L. Any other method of mounting and connecting the rod P may, however, be substituted. In order to hold the contact-bridge H normally out of contact with the conductor C, a spring Q is provided, the end of which presses against a lug or leaf $q$, formed on the rod P, as shown in Figs. 5 and 6. A lug or toe $q'$ prevents the spring pressing the contact-bridge H too far in the opposite direction by coming in contact with the opposite face of the plate L. Near the top of the rod P there is fixed to it an arm P', projecting laterally in convenient position to be operated by the foot of the gripman. Normally this arm occupies the position shown in plan in full lines in Fig. 6. When any trouble occurs which renders it necessary that the cable shall be stopped, the gripman has only to press his foot against the arm P' and thrust it to the position shown in dotted lines in Fig. 6, thereby bringing the contact-bridge H against the conductor C, in order to send a "danger" alarm to the power-house.

The mechanism being now understood, I will describe the operation of the electrical circuits. Normally the current is flowing from the positive pole of the battery E through $a$, thence through the entire length of the conductor C, thence through the wire $b$, magnet M, contact $c$, armature-lever $d$, and wire $e$ back to the negative pole of the battery. The current thus continually flowing through the coils of the magnet M keeps it excited and causes it to hold its armature $r$ attracted to it against the tension of its retracting-spring $s$. The magnet R is not excited, so that its armature is held retracted and the circuit connection $c\,d$ is maintained. When, however, any gripman operates his contact-bridge H, he forms an electrical connection between the conductor C and the structure, so that the current flows through the latter and the wire $g$ and magnet R to the negative pole of the battery. The current thus has two paths, one through the magnet M and the other through the magnet R. The relative resistances are such that sufficient current flows through the magnet R to excite it and attract its armature against the tension of its spring $s$, which is a light spring. Thereby the armature-lever $d$ is drawn away from the stop $c$ and the circuit through the magnet M is broken, so that this magnet is discharged and releases its armature. The release of this armature is made to give the signal in any desired way. I have shown one method of giving the signal, which is the one that I prefer in practice. It consists of a local circuit T, energized by a separate battery E' (or by a shunt from the battery E, or in any other way known to electricians) and including the coils and contact of a rheotome S (which constitutes the annunciator or alarm) and including the armature-lever $r'$ and stop $s'$, pertaining to the magnet M. When the armature $r$ falls away, this lever makes contact with this stop and closes the circuit T, whereupon the rheotome S is set into vibration and a hammer carried by its armature-lever strikes repeatedly against the gong $t$, thereby sounding an alarm, which will continue until it is stopped by the attendant. Instantly on hearing this alarm the engineer or attendant in the power-house should stop the cable. Having done so, he should throw a switch-lever U over from the position marked "Signal to stop" to the position marked "Signal to start," thereby moving it from a blind contact onto a contact-plate $u$, which is connected by a wire $v$ with the wire $b$ on the opposite side of the magnet M, and thence through the relay connections $c\,d$ with the negative pole of the battery, while the opposite pole of the battery is connected by wire $u'$ with the fulcrum of the lever U. This action short-circuits the battery E through the circuit $u'$, $v$, M, $c$, $d$, and $e$, so that (assuming that this short circuit has been closed by the release of the contact-bridge H from the conductor C and the consequent demagnetization of the magnet R) the current flowing in this short circuit excites the magnet M so powerfully as to cause it to re-attract its armature against the tension of the spring $s$, thereby breaking the alarm-circuit T and stopping the alarm-bell. In case of the cessation of the current through R before the switch U is thus thrown over, the re-establishment of the normal current through $a$, C, $b$, and M does not suffice to reattract the armature $r$, because this armature has been drawn so far away from the magnet M that only a current of extraordinary strength will excite the magnet M sufficiently to move back the armature. The short circuit $u'\,v$, being of extremely low resistance, affords a sufficiently strong current to accomplish this reattraction. The apparatus is now in position to receive a signal to start, which may be given from any one of the grip-cars by bringing the contact-bridge H against the conductor C, whereupon a portion of the current is diverted through the relay-magnet R sufficient to enable it to attract its armature $d$ and thereby break the short circuit $u'$ $v$ and demagnetize the secondary magnet M, so that the latter releases its armature and closes the circuit T and rings the bell. As soon as the contact at the grip-car ceases the relay-armature $d$ falls off and re-establishes the short circuit $u'$ $v$, thereby causing the magnet M to again attract its armature and stop the ringing of the bell. In this way intermittent signals—such as dots or dashes—may be transmitted according to any prescribed code to indicate to the engineer that he shall start the cable, or to transmit any other information. When he has finally received the signal to start, he will throw the lever U back to its normal position, as shown in full lines in Fig. 1, whereupon the apparatus is in readiness to receive another signal to stop.

In case of any break in or disturbance of the normal circuit $a$ C $b$ $e$, which constitutes the defect-alarm circuit, the current through the magnet M is interrupted or so weakened as to cause this magnet to release its armature, thereby closing the secondary circuit T and ringing the alarm-bell. Thus the alarm indicates danger in any case, whether that danger proceeds from the mechanical derangement of the cable-grip or the electrical derangement of the alarm-circuits. As the latter contingency, although much less liable to occur, may be of as great danger as the former, owing to its being impossible to transmit a signal when danger from the former cause occurs, it is highly important to have automatic notice of it at the power-house. Such a break of the circuit is so unlikely to occur that the provision for the separate signal for indicating it is ordinarily unadvisable. If, however, such separate signal is desired, it may be provided by adopting the construction shown in Fig. 9. In this figure the magnets R and M are in entirely distinct branches $g$ and $b$ of the circuit, the branch $b$ no longer traversing the relay-contacts $c$ and $d$, but being continued by an unbroken wire $e$ directly to the negative pole of the battery. The local circuit T is operated by the relay R and includes the rheotomic bell-ringer S, which constitutes the signal for stopping the cable. The magnet M constitutes a closed-circuit relay for operating a separate local circuit T', which includes a rheotomic bell S', which constitutes the signal for indicating a broken or defective circuit.

Fig. 8 shows a much simpler arrangement of the circuit for giving the alarm for stopping the cable, which embodies merely a part of my invention. The circuit-wire $a$ from the positive pole of the battery E is here branched and connected to the separate contact-conductors C C, arranged adjacent to the tracks D D, which are themselves connected by a branch wire $g$ $g$ to the receiving relay-magnet R and thence to the negative pole of the battery. The secondary magnet M is omitted, the local circuit T being controlled by the relay R instead. Both circuits are normally open; but when any gripman connects his contact-bridge with the conductor C the circuit through the relay R is closed, and this relay attracts its armature into contact with the stop $s'$, thereby closing the circuit T and ringing the bell. This arrangement is inferior to that first described, in that there is no means provided for giving a warning at the power-house in case the circuits become broken or disconnected.

Fig. 7 shows a modified application of the contact-conductor C and the circuit-closing contact-bridge carried by the car. The railway here shown not being one in which a conduit is employed, it is admissible to arrange the conductor C above the rails and close to the car-body. It is here shown as being partially inclosed in an insulating-bar K, as before, and mounted on posts $j'$ at the side of the track. The car is provided with a contact lever or bridge H', pivoted at $k'$ to the car, with its free end projecting over the conductor C and held out of contact therewith by a spring $j''$. This lever H' is in electrical connection with the rails through the car frame, axles, and wheels, as denoted by the dotted line $i'$. To transmit the alarm the gripman has only to press his foot on a treadle V, which connects through the floor of the car with the lever H' and presses the latter down against the conductor C, or, in lieu of the lever H' and treadle V, a hand-bar H'' may be employed, connected by a wire $i''$ with the conducting parts of the car, and normally hung on a hook $w$, so that in case of accident the gripman can unship it and by holding it in his hand press its forked lower end onto the conductor C. Only a momentary contact in any case is required, since as soon as the magnet M has released its armature it cannot reattract it.

My invention is by no means limited to the exact construction shown, but may be variously modified in order to adapt it to different requirements and to enable it to be used with various styles of grips.

Instead of giving an alarm in the power-house, the receipt of the signal might be otherwise manifested in any way known to the art of electric signaling or to the mechanical or electrical arts.

Figure 10:
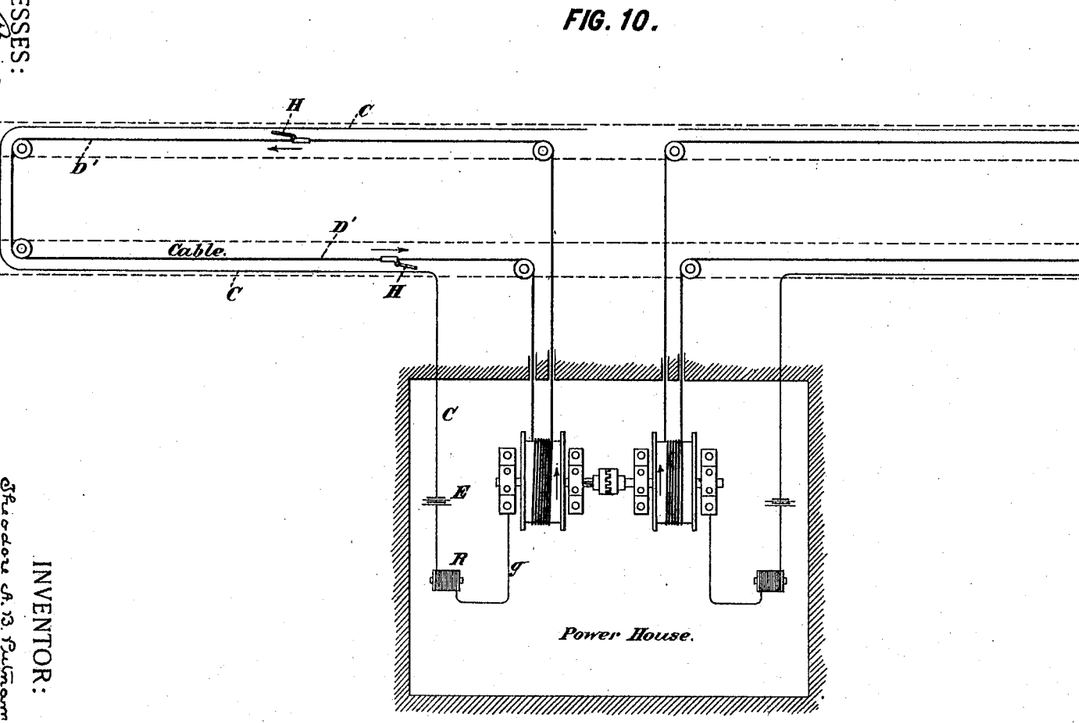
Fig. 10 is a diagram showing the utilization of the cable as a return electric conductor or ground.

The ground or earth connection between the wire $g$ and the several grip-cars might be made through the cable instead of through the track-rails or other part of the structure to like effect. Fig. 10 shows how this may be done, the circuit connection being made to the cable-drum or driving machinery, so that this and the cable constitute in effect a return or earth circuit or ground. The grip-shoes of the cable cars should be of metal, to make electric connection with the cable.

I claim as my invention the following-defined novel features and combinations, substantially as hereinbefore specified, namely:

1. The combination, with a cable railway, including its track, endless cable, stationary source of power at a power-house for driving said cable, cable cars, and grip connections between the cars and cable, of means for enabling a signal to be instantaneously sent from any car to the power-house, consisting of an electric circuit comprising a conductor extended along the track or portion thereof whereon the cars are driven by said cable, a source of electric energy in connection with said circuit, an electro-magnet at the power-house for signaling purposes in communication with said circuit, and circuit-manipulating devices upon the respective cars for influencing said circuit to enable signals to be sent by any gripman to the power-house to cause the cable to be stopped or otherwise controlled.

2. The combination, with a cable railway, including its track, endless cable, stationary source of power at a power-house for driving said cable, cable cars, and grip connections between the cars and cable, of means for enabling a signal to be instantaneously sent from any car to the power-house, consisting of a normally-open electric circuit comprising a contact-conductor extended continuously adjacent to the track or portion thereof whereon the cars are driven by said cable, an electric generator in connection with said circuit, an electro-magnet at the power-house for signaling purposes in communication with said circuit and adapted to give a signal upon the closure thereof, and circuit-closing devices upon the respective cars adapted to be manipulated at will by the gripman, whereby a signal may be sent from any car at any instant to the power-house to cause the cable to be stopped or otherwise controlled.

3. The combination, with a cable railway, including its track, endless cable, stationary source of power at a power-house for driving said cable, cable cars, and grip connections between the cars and cable, of means for enabling a signal to be instantaneously sent from any car to the power-house, consisting of a normally-open electric circuit comprising a contact-conductor extended continuously adjacent to the track or portion thereof whereon the cars are driven by said cable, an electric generator having one terminal connected to said conductor, a signal-receiving magnet at the power-house in connection with said circuit and adapted to give a signal upon the closing thereof, and circuit-closing devices upon the respective cars, consisting each of a contact-bridge in electric connection with the opposite terminal of said electric generator, normally out of contact with said contact-conductor and movable at will into contact therewith in order to close said circuit and cause a signal to be given at the power-house.

4. The combination, with a cable railway, including its track, endless cable, stationary source of power at a power-house for driving said cable, cable cars, and grip connections between the cars and cable, of means for enabling a signal to be instantaneously sent from any car to the power-house, consisting of a normally-open electric circuit comprising a contact-conductor extended continuously adjacent to the track or portion thereof whereon the cars are driven by said cable, an electric generator in connection with said circuit, an electro-magnet at the power-house for signaling purposes in connection with said circuit and adapted to give a signal upon the closure thereof, circuit-closing devices upon the respective cars adapted to be manipulated at will by the gripman to send a signal, and a normally-closed defect-alarm circuit, including said contact-conductor as part thereof, an electric generator maintaining a normal current on said closed circuit, and an electro-magnet in connection with said circuit adapted to give an alarm in case of a break or defect therein.

5. The combination, with a cable railway, of an electric circuit including a contact-conductor extending continuously along the track and connected with one terminal of an electric generator, a contact-bridge carried by a cable car and electrically connected with the opposite terminal of said generator and adapted to make contact with said contact-conductor and normally open-circuited thereto, whereby the circuit thus formed is an open circuit, with a receiving-magnet at the power-house in said open circuit, so that when said circuit is closed through the contact-bridge to said conductor said magnet is excited and a signal is given, and an electric connection between the opposite ends of said contact-conductor, with an electric generator in the latter connection, thereby forming a normally-closed circuit, and an electro-magnet in the latter circuit, whereby on the breaking of the closed circuit the latter magnet is demagnetized and an alarm is given.

6. The combination, with a cable railway, of a contact-conductor extended continuously along the track and connected at its opposite ends with the opposite poles of an electric generator, thereby constituting a closed circuit, an annunciator at the power-house, an electro-magnet in said circuit normally excited by the current therein operatively connected with said annunciator and adapted to operate the latter to give a signal upon the cessation or diminution of said current, and contact-bridges carried by the moving cable cars in electric connection with one terminal of said generator and normally out of electric connection with said contact-conductor, whereby by closing the circuit through either of said bridges to said contact-conductor a second closed circuit is formed and said magnet is short-circuited.

7. The combination, with a cable railway, of an electric circuit including a contact-conductor extended along the track and connected at opposite ends with the opposite terminals of a current-generator, whereby a closed circuit is formed, a contact-bridge carried by a cable car and electrically connected with one of the terminals of said generator and normally out of electric connection with said contact-conductor, whereby an open circuit is formed including said contact-conductor, a receiving relay-magnet in said latter circuit, with its normally-retracted armature-lever in the closed circuit and arranged to break such connection on the excitation of the relay, and a secondary magnet in said closed circuit, whereby such secondary magnet is normally excited and holds its armature attracted, but upon the breaking of said closed circuit either along the line or by the excitation of said relay it is demagnetized and releases its armature, whereby the signal is given.

8. The combination, with a cable railway, of an electric circuit including a contact-conductor and an electric generator, with an electro-magnet in said circuit and normally attracting its armature, a normally-broken short circuit including said magnet, and a switch for closing said short circuit and thereby sending a stronger current through said magnet to cause it to reattract its armature.

In witness whereof I have hereunto signed my name in the presence of two subscribing witnesses.

THEODORE A. B. PUTNAM.

Witnesses:
GEORGE H. FRASER,
ARTHUR C. FRASER.

It is hereby certified that Letters Patent No. 457,565, granted August 11, 1891, upon the application of Theodore A. B. Putnam, of New York, N. Y., for an improvement in "Signaling Telegraphs for Cable-Railways," was erroneously issued to said Putnam; Ella S. Webster, Albert Comstock, and Joshua W. Powell as sole owners of the patent; whereas said Letters Patent should have been issued to said *Putnam, Ella S. Webster, Albert Comstock, and Arthur C. Fraser* as shown by the record of assignments in this Office; and that the said Letters Patent should be read with this correction therein that the same may conform to the record of the case in the Patent Office.

Signed, countersigned, and sealed this 1st day of September, A. D. 1891.

[SEAL.]

CYRUS BUSSEY,
*Assistant Secretary of the Interior.*

Countersigned:
N. L. FROTHINGHAM,
*Acting Commissioner of Patents.*